(No Model.)
W. P. PRALL.
SULKY HAY RAKE.
No. 267,250. Patented Nov. 7, 1882.
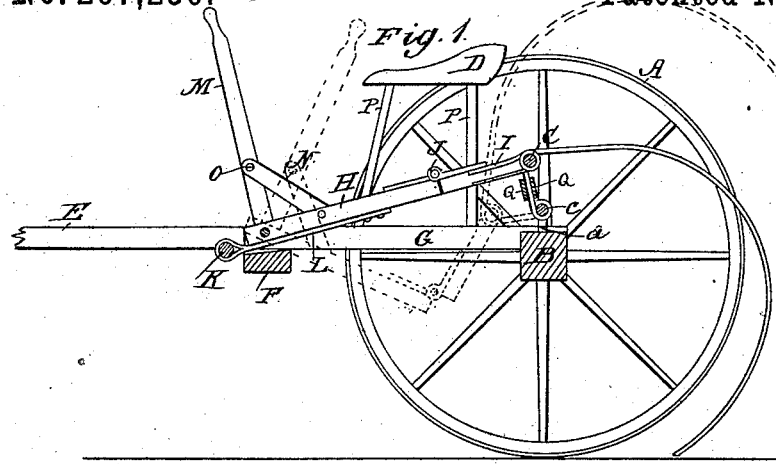
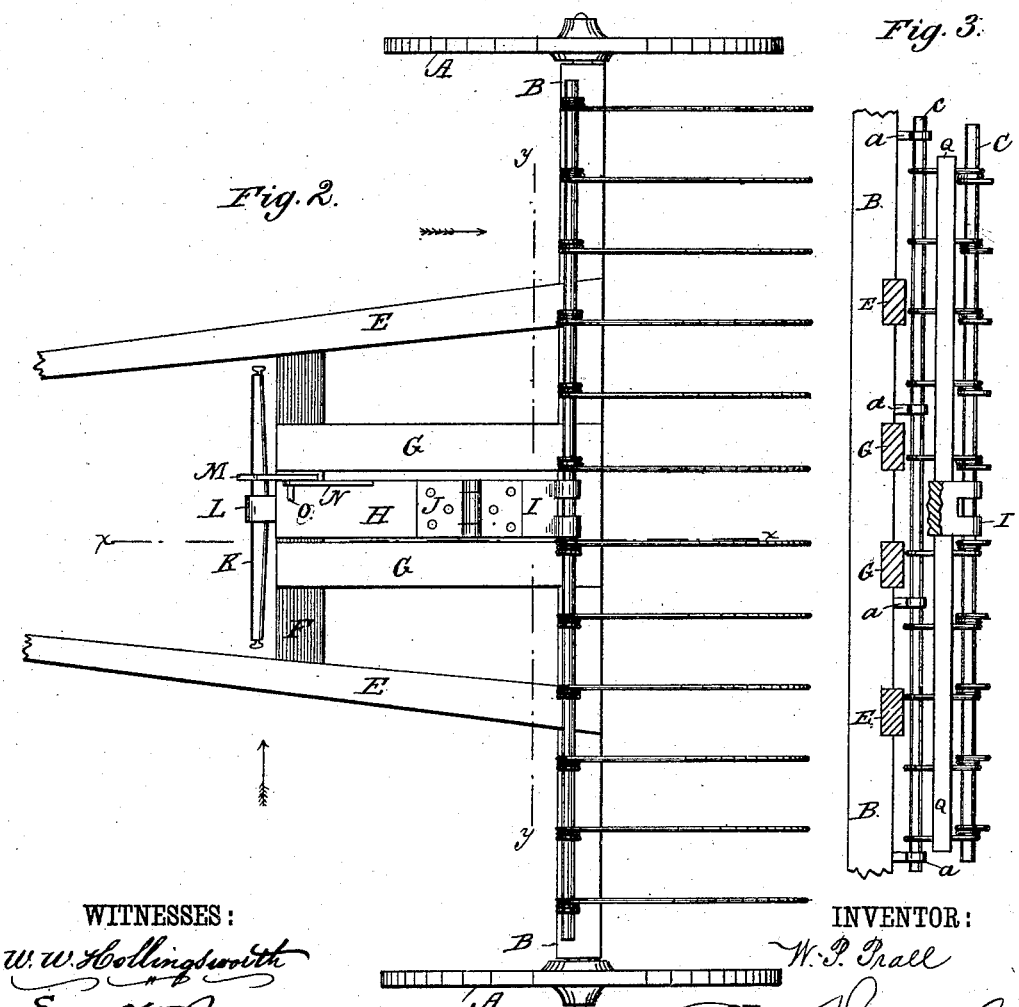
WITNESSES:
W. W. Hollingsworth
Edw. W. Byrn
INVENTOR:
W. P. Prall
BY
ATTORNEYS.

UNITED STATES PATENT OFFICE.

WALTER P. PRALL, OF COLUSA, CALIFORNIA.

SULKY HAY-RAKE.

SPECIFICATION forming part of Letters Patent No. 267,250, dated November 7, 1882.

Application filed February 14, 1882. (No model.)

*To all whom it may concern:*

Be it known that I, WALTER P. PRALL, of Colusa, in the county of Colusa and State of California, have invented a new and useful Improvement in Sulky Hay-Rakes; and I do hereby declare that the following is a full, clear, and exact description of the same, reference being had to the accompanying drawings, forming part of this specification, in which—

Figure 1 is a vertical section through the line *x x* of Fig. 2. Fig. 2 is a plan view. Fig. 3 is a section through the line *y y* of Fig. 2.

This invention relates to a new and useful improvement in sulky spring-tooth hay-rakes. It belongs to that general class of hay-rakes in which the draft attachment is made to cooperate with a lever in raising and dumping the rake; and the improvement consists in the novel arrangement and combination of a certain jointed bar and lever in connection with the rake-head and draft, whereby the rake is unloaded and otherwise controlled; also, to the improved manner in which the rake part itself is constructed, which consists of an elevated rake-head formed by two rods or bars arranged vertically one above the other, one of which passes through the coils of the teeth, and the other of which passes through an eye at the end of each tooth, and both of which are arranged horizontally and are jointed to the top of the axle. The object of its being thus formed and the advantage gained are to allow more room for the collected hay, and thereby avoid the upward pressure, which causes the teeth to rise and allows the rake to pass over the hay without performing its intended work.

To enable others skilled in the art to which my invention appertains to make and use the same, I will proceed to describe its construction, which is very simple.

A A are the wheels; B, the axle, upon which is supported the lower bar, *c*, of rake-head by passing through appropriate eyes *a a a*, which are inserted in the axle B.

E E are the thills, which are attached to the upper side of the axle B and connected by a cross bar or brace, F, while two central beams, G G, connect the cross-bar F to the axle B.

Between the central beams, G G, at the front end, is pivoted a jointed bar, H, the rear end of which is attached to upper bar, C, of the rake-head by means of a clasp, I.

At or near the middle of bar H, on the upper side, is placed a durable hinge, J, which, with the abutting ends of the sections of the bar H, forms a rule or knuckle joint that will bend downward but not upward.

K is the single-tree, which is attached to the lower side of bar H by means of a suitable strap, L, which passes through a transverse recess or groove in the upper surface of cross-bar F.

At the front end of bar H, on the same pivot upon which bar H turns, is a small upright lever, M, which is connected to bar H by a short brace, N. At the upper end of the brace N, where it connects with lever M, is a foot-piece or arm, O, for the purpose of operating the lever M and bar H by foot-pressure.

It will be seen that the draft is applied from the single-tree by means of the strap, which is securely fastened to the lower side of the rule-jointed bar, which latter is pivoted upon the front part of the frame-work and extends to the upper rod of rake-head, and to which it is attached by means of a clasp. This jointed bar is, as before stated, governed or controlled by means of the upright lever, which is operated both by hand and foot. It will also be observed that by the simple forward pressure of the foot upon the foot-piece of the lever the jointed bar is brought up to its proper position for holding the rake-teeth down, and acts as a brace or support to the rake while in position for raking, and the draft-line being at this time practically parallel with the bar to which it is attached has but slight effect upon its joint; but by the driver releasing the foot-pressure and drawing the hand-lever back the joint of the bar H is broken and the draft-line altered or changed, the effect of which draws the said bar down, followed by the rake-head, which motion raises the rake-teeth, and thus causes the collected hay to be discharged. This so lessens the draft that the rake is again permitted to be reset for raking with ease and facility by means of the lever.

D is the driver's seat, which is elevated on stanchions P P P P, attached to the central beams, G G. The rake consists of coiled spring-teeth formed, as described, in such a manner as to construct an elevated rake-head, the parts of which are held in position by two slat-clamps, Q Q, which are placed between the two bars c C of rake-head and run parallel with the same.

I do not claim broadly jointing the bar H so that it will bend down but not up beyond a straight line, but only its rule-jointed character, which causes the ends to abut and act as stops, in combination with the strap L, attached to the under side of said bar.

Having thus described my invention, what I claim as new is—

1. The rake constructed of two horizontal bars, c C, arranged one above the other, in combination with the teeth, which are first attached to lower bar, c, by an eye in the teeth, through which the bar c passes, thence wound around the upper bar, C, and continued back and down, and the axle jointed to the lower one of said rods or bars, whereby an elevated rake-head is formed, which allows ample room for the collected hay.

2. The combination, with the hand-lever and the rake, of the rule-jointed bar H, having its forward end pivoted to the main frame and its rear end to the rake-head, the single-tree, and the strap connecting the single-tree to the lower side of said bar at a point in the rear of its forward pivot, as and for the purpose described.

WALTER P. PRALL.

Witnesses:
A. P. SPAULDING,
J. B. LEE.